(12) United States Patent
Shpigelman

(10) Patent No.: US 10,387,194 B2
(45) Date of Patent: Aug. 20, 2019

(54) SUPPORT OF NON-TRIVIAL SCHEDULING POLICIES ALONG WITH TOPOLOGICAL PROPERTIES

(71) Applicant: International Business Machines Corporation, Armonk, NY (US)

(72) Inventor: Igor Shpigelman, Toronto (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 136 days.

(21) Appl. No.: 15/219,071

(22) Filed: Jul. 25, 2016

(65) Prior Publication Data

US 2016/0335013 A1 Nov. 17, 2016

Related U.S. Application Data

(63) Continuation of application No. 14/030,953, filed on Sep. 18, 2013, now Pat. No. 9,424,086, which is a continuation of application No. 12/568,450, filed on Sep. 28, 2009, now Pat. No. 8,601,480, which is a continuation of application No. 10/842,497, filed on May 11, 2004, now Pat. No. 7,596,788.

(51) Int. Cl.

| G06F 9/46 | (2006.01) |
|---|---|
| G06F 9/48 | (2006.01) |
| G06F 9/50 | (2006.01) |
| G06F 3/06 | (2006.01) |
| G06F 13/16 | (2006.01) |

(52) U.S. Cl.
CPC .......... *G06F 9/4881* (2013.01); *G06F 3/0619* (2013.01); *G06F 3/0629* (2013.01); *G06F 3/0644* (2013.01); *G06F 3/0689* (2013.01); *G06F 9/50* (2013.01); *G06F 9/5016* (2013.01); *G06F 13/1663* (2013.01); *G06F 2209/483* (2013.01); *G06F 2212/2542* (2013.01)

(58) Field of Classification Search
None
See application file for complete search history.

(56) References Cited

U.S. PATENT DOCUMENTS

| 5,708,772 | A | 1/1998 | Zeldin et al. | |
|---|---|---|---|---|
| 6,112,023 | A | 8/2000 | Dave et al. | |
| 6,289,424 | B1 * | 9/2001 | Stevens | G06F 9/5016 711/147 |
| 6,374,403 | B1 | 4/2002 | Darte et al. | |
| 6,611,858 | B1 * | 8/2003 | Aravamudan | G06F 12/0269 707/999.1 |
| 6,766,515 | B1 | 7/2004 | Bitar et al. | |
| 6,842,906 | B1 | 1/2005 | Bowman-amuah | |

(Continued)

*Primary Examiner* — Kenneth Tang
(74) *Attorney, Agent, or Firm* — James L. Baudino

(57) ABSTRACT

A system includes a topology monitoring unit to generate a topology map of a machine where the machine includes node boards in host computers. The topology map is indicative of interconnections of resources of the machine. The topology monitoring unit queries the machine to identify elements of the machine, stores all the elements of the machine in a string array, generates a key for each element as an array of integers where each integer in the array represents an offset into the string array, and generates the topology map of the machine using the generated keys.

15 Claims, 7 Drawing Sheets

(56) References Cited

U.S. PATENT DOCUMENTS

| | | | |
|---|---|---|---|
| 7,111,147 B1* | 9/2006 | Strange | G06F 3/0607 |
| | | | 711/114 |
| 7,137,126 B1* | 11/2006 | Coffman | G06F 17/30899 |
| | | | 719/328 |
| 7,331,048 B2 | 2/2008 | Skovira | |
| 7,363,211 B1* | 4/2008 | Naganathan | H04L 41/12 |
| | | | 703/2 |
| 7,596,788 B1* | 9/2009 | Shpigelman | G06F 9/4881 |
| | | | 718/100 |
| 8,601,480 B2* | 12/2013 | Shpigelman | G06F 9/4881 |
| | | | 718/100 |
| 9,424,086 B2* | 8/2016 | Shpigelman | G06F 9/4881 |
| 2002/0147611 A1* | 10/2002 | Greene | G06Q 10/063112 |
| | | | 705/1.1 |
| 2004/0123296 A1* | 6/2004 | Challenger | G06F 9/5027 |
| | | | 718/102 |
| 2005/0055350 A1 | 3/2005 | Werme et al. | |
| 2005/0071843 A1* | 3/2005 | Guo | G06F 9/505 |
| | | | 718/101 |
| 2005/0154860 A1 | 7/2005 | Arimilli et al. | |
| 2005/0226248 A1* | 10/2005 | Modi | H04L 63/065 |
| | | | 370/395.5 |
| 2005/0235055 A1* | 10/2005 | Davidson | G06F 9/46 |
| | | | 709/223 |
| 2005/0235286 A1* | 10/2005 | Ballew | G06F 9/5038 |
| | | | 718/100 |
| 2010/0146515 A1 | 6/2010 | Shpigelman | |

\* cited by examiner

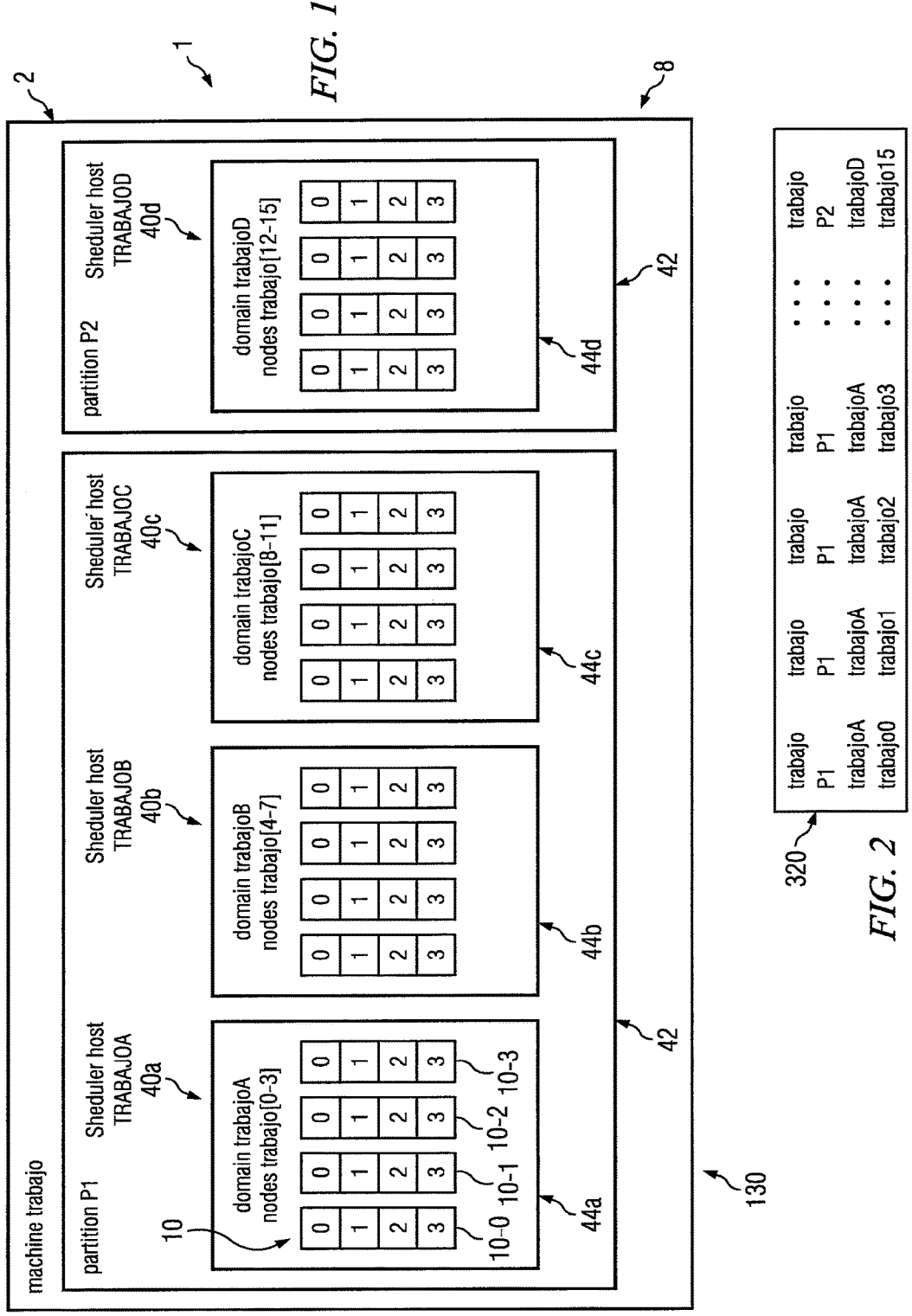

| 0: | trabajo |
| 1: | P1 |
| 2: | domain trabajoA |
| 3: | node trabajo0 |
| 4: | node trabajo1 |
| 5: | node trabajo2 |
| 6: | node trabajo3 |
| 7: | domain trabajo0B |
| 8: | node trabajo4 |
| 9: | node trabajo5 |
| 10: | node trabajo6 |
| 11: | node trabajo7 |
| 12: | domain trabajoC |
| 13: | node trabajo8 |
| 14: | node trabajo9 |
| 15: | node trabajo10 |
| 16: | node trabajo11 |
| 17: | P2 |
| 18: | domain trabajoD |
| 19: | node trabajo12 |
| 20: | node trabajo13 |
| 21: | node trabajo14 |
| 22: | node trabajo15 |

*FIG. 4*

360 trabajo0 ↔ (trabajo, P1, trabajoA, trabajo0) ↔ {0,1,2,3}
trabajo1 ↔ (trabajo, P1, trabajoA, trabajo1) ↔ {0,1,2,4}
⋮                    ⋮                    ⋮
trabajo15 ↔ (trabajo, P2, trabajoD, trabajo15) ↔ {0,17,18,22}

382           383
   ↘           ↙   ↙ 381
trabajoC ↔ {trabajo, P1, trabajoC, *} ↔ {0,1,-12,-1}
P1 ↔ {trabajo, P1, *, *} ↔ {0,1,-1,-1}     ↖ 391
      ↖         ↖            ↖
      390       392          393

SUPPORT OF NON-TRIVIAL SCHEDULING POLICIES ALONG WITH TOPOLOGICAL PROPERTIES

FIELD OF THE INVENTION

The present invention relates to a multiprocessor system. More particularly, the present invention relates to a method, system and computer program product for scheduling jobs in a multiprocessor machine, such as a multiprocessor machine, which has topological properties.

BACKGROUND OF THE INVENTION

Multiprocessor systems have been developed in the past in order to increase processing power. Multiprocessor systems comprise a number of central processing units (CPUs) working generally in parallel on portions of an overall task. Some jobs such as parallel jobs generally have tasks which can be executed in parallel by more than one CPU.

A particular type of multiprocessor system used in the past has been a symmetric multiprocessor (SMP) system. An SMP system generally has a plurality of processors, with each processor having equal access to shared memory and input/output (I/O) devices shared by the processors. An SMP system can execute jobs quickly by allocating to different processors parts of a particular job. To further increase processing power, processing machines have been constructed comprising a plurality of SMP nodes. Each SMP node includes one or more processors and a shared memory. Accordingly, each SMP node is similar to a separate SMP system. In fact, each SMP node need not reside in the same host, but rather could reside in separate hosts.

In the past, SMP nodes have been interconnected in some topology to form a machine having non-uniform memory access (NUMA) architecture. A NUMA machine is essentially a plurality of interconnected SMP nodes located on one or more hosts, thereby forming a cluster of node boards on one or more hosts.

Generally, each SMP node is interconnected and cache coherent so that a processor on any other SMP node can access the memory in an SMP node. However, while a processor can access the shared memory on the same SMP node uniformly, meaning within the same amount of time, processors on different boards cannot access memory on other boards uniformly. Accordingly, an inherent characteristic of NUMA machines and architecture is that not all of the processors can access the same memory in a uniform manner. In other words, while each processor in a NUMA system may access the shared memory in any SMP node in the machine, this access is not uniform.

Computers or machines where the link speed between CPUs or other resources such as memory can change and is not homogenous for each CPU, such as NUMA machines, can be defined more generally as machines that have topological properties. For example, a machine may be considered to have topological properties if two identical jobs placed on the same machine, but being executed by different central processing unit (CPU) sets, may exhibit different performance characteristics. Therefore, NUMA machines will, by definition, have topological properties because not all of the processors can access the same memory in a uniform manner. Other types of machines may also have topological properties depending on the link speed between the CPUs, memory and other resources. By contrast, some types of machines, which have non-trivial topologies, could nevertheless not exhibit topological properties simply because the link speeds are so high that the resulting latency is trivial such that the resources can be considered as homogenous. However, the resources on most present high-performance computers (HPC) cannot be treated as homogenous resources because of the complexity of the underlying topology of the machines and therefore most present HPC machines exhibit topological properties.

This non-uniform access results in a disadvantage in machines having topological properties, such as NUMA systems, in that a latency is introduced each time a processor accesses shared memory, depending on the actual topology of the combination of CPUs and nodes upon which a job is scheduled to run. In particular, it is possible for program pages to reside "far" from the processing data, resulting in a decrease in the efficiency of the system by increasing the latency time required to obtain this data. Furthermore, this latency is unpredictable because it depends on the location where the shared memory segments for a particular program may reside in relation to the CPUs executing the program. This affects performance prediction, which is an important aspect of parallel programming. Therefore, without knowledge of the topology, performance problems can be encountered in NUMA machines.

Prior art devices have attempted to overcome the deficiencies inherent in NUMA systems and other systems exhibiting topological properties in a number of ways. For instance, programming tools to optimize program page and data processing have been provided. These programming tools for programmers assist a programmer to analyze their program dependencies and employ optimization algorithms to optimize page placement, such as making memory and process mapping requests to specific nodes or groups of nodes containing specific processors and shared memory within a machine. While these prior art tools can be used by a single programmer to optimally run jobs in a NUMA machine, these tools do not service multiple programmers well. Rather, multiple programmers competing for their share of machine resources may conflict with the optimal job placement and optimal utilization of other programmers using the same NUMA host or cluster of hosts.

To address this potential conflict between multiple programmers, prior art systems have provided resource management software to manage user access to the memory and CPUs of the system. For instance, some systems allow a specific programmer to "reserve" CPUs and shared memory within a NUMA machine. One such prior art system is the Miser™ batch queuing system that chooses a time slot when specific resource requirements, such as CPU and memory, are available to run a job. However, these batch queuing systems suffer from the disadvantage that they generally cannot be changed automatically to re-balance the system between interactive and batch environments. Also, these batch queuing systems do not address job topology requirements that can have a measurable impact on the job performance.

Another manner to address this conflict has been to use groups of node boards, which are occasionally referred to as "CPUsets" or "processor sets". Processor sets specify CPU and memory sets for specific processes and have the advantage that they can be created dynamically out of available machine resources. However, processor sets suffer from the disadvantage that they do not implement any resource allocation policy to improve efficient utilization of resources. In other words, processor sets are generally configured on an ad-hoc basis.

Furthermore, a disadvantage of the above-noted prior art systems is that they do not generally provide for non-trivial scheduling. Non-trivial scheduling can be defined in general as scheduling which requires more than one scheduling cycle in which to schedule a job. Non-trivial scheduling may involve not scheduling a job or suspending a job to execute other jobs.

Some typical examples of non-trivial scheduling include reserving resources for future use, such as if a large job that needs many resources is to be scheduled, the scheduler can commence reserving the resources so that sufficient resources are available to run the large job when other resources which may be executing other jobs or are otherwise occupied, become available. In this situation, a large job may be held back for several scheduling cycles until sufficient resources have become reserved and/or are available to execute the job. Another non-trivial scheduling technique is sometimes referred to as "backfill" which involves running small jobs on resources which have been temporarily reserved for large jobs until sufficient resources become available for the large job to be run. For example, if three slots have already been reserved for a large job which requires six slots in order to operate, the three slots which have been reserved can be "backfilled" with smaller jobs which only require one, two or three slots to execute. In this case, the scheduler can run smaller jobs as backfill on the reserved resources until there are sufficient resources available to run the larger job.

Other non-trivial scheduling techniques include pre-emption which is a policy whereby two jobs can be assigned different priorities and the lower priority job that is running may be suspended or pre-empted in order to execute the larger priority job. This can be used, for example, when a higher priority job requires access temporarily to resources which are already being executed by a lower priority job.

While non-trivial scheduling has been used in the past, non-trivial scheduling has not been implemented successfully to date with machines having topological properties. In other words, to the extent that non-trivial scheduling has been used in the part with machines having topological properties, the topological properties have been ignored potentially resulting in inefficient allocation of jobs and/or conflicting execution of jobs requiring jobs to be rescheduled again. In essence, utilizing non-trivial scheduling of jobs, while ignoring topological properties results in "hit or miss" scheduling which may or may not be successful depending on whether or not the topological properties become a factor.

A further disadvantage common to some prior art resource management software for NUMA machines is that they do not consider the transient state of the NUMA machine. In other words, none of the prior art systems consider how a job being executed by one SMP node or a cluster of SMP nodes in a NUMA machine will affect execution of a new job. To some extent, these disadvantages of the prior art have been addressed by the system disclosed in U.S. patent application Ser. No. 10/053,740 filed on Jan. 24, 2002 and entitled "Topology Aware Scheduling for a Multiprocessor System," which is hereby incorporated herein by reference. This U.S. application discloses a manner in which the status of various node boards within a host having a certain topology can be used in order to allocate resources such as by providing the number of free CPUs for different radii, or, calculating the distance between free CPUs calculated in terms of the delay in various interconnections. However, U.S. patent application Ser. No. 10/053,740 does not specifically address non-trivial scheduling in a multiprocessor system having topological properties.

Furthermore, in the past, programmers had the ability to specify, together with the job, the number of CPUs required to execute the job. However, more advanced systems permit the programmers to specify not only the number of CPUs but also characteristics of the placement of the number of nodes or number of CPUs per node to use, whether or not the placement is to be contiguous, to start from a specific node and/or to use the same CPU indices on all the nodes used for the allocation. For example, more advanced architecture permits programmers to specify not only the plain number of CPUs to use for the job, but also to specify the allocation shape of the resources to be used in two dimensions and to a certain extent the allocation efficiency for the job. To date, the prior art systems have failed to permit scheduling jobs which have been specified by a programmer to have a certain shape, or to do so using non-trivial scheduling with a system having topological properties.

Accordingly, there is a need in the art for a scheduling system which can dynamically schedule jobs and allocate resources, but which is nevertheless governed by a policy to improve efficient allocation of resources and accommodate non-trivial scheduling. Also, there is a need in the art for a system and method to have the ability to be implemented by multiple programmers competing for the same resources. Furthermore, there is a need in the art for a method and system to schedule and dispatch jobs, which specify the allocation shape of the resources in more than one dimension while accommodating topological properties of the machine. Furthermore, there is a need in the art for a method, system and computer program product which can dynamically monitor the status of a machine having topology properties and schedule and dispatch jobs in view of transient changes in the status of the topology of the machine.

SUMMARY OF THE INVENTION

Accordingly, it is an object of this invention to at least partially overcome the disadvantages of the prior art. Also, it is an object of this invention to provide an improved type of method, system and computer program product that can more efficiently schedule and allocate jobs in machine having topology properties.

Accordingly, in one of its aspects, this invention resides in a computer system comprising resources arranged at least in part on node boards in host computers, each node board having at least one central processor unit (CPU) and shared memory, said node boards being interconnected into groups of node boards providing access between the central processing units (CPUs) and shared memory on different node boards, a scheduling system to schedule a job having resource mapping requirements to said resources, said scheduling system comprising: a scheduling unit for scheduling jobs to resources, said scheduling unit generating a candidate host list representing the resources in the host computers available to execute the job to be scheduled based on resource requirements of the job to be scheduled; a topology library unit comprising a machine map M of the computer system, said machine map M indicative of the interconnections of the resources in the computer system to which the scheduling system can schedule the jobs; a topology monitoring unit for monitoring a status of the resources and generating status information signals indicative of a status of the resource; wherein the topology library unit receives the status information signals and the candidate host list and determines a free map F of resources to execute the job to be scheduled, said free map F indicative of the interconnection of the resources to which the job in a current scheduling cycle can be scheduled based on the status information signals, the candidate host list and the machine map M; and wherein the topology monitoring unit dispatches a job to the resources in the free map F which matches the resource mapping requirements of the job.

In another aspect, the present invention resides in a computer system comprising resources physically located in more than one module, said resources including a plurality of processors being interconnected by a number of interconnections in a physical topology providing non-uniform access to other resources of said computer system, a method of scheduling a job to said resources, said method comprising in a computer system comprising resources arranged at least in part in on nodes boards, each node board having at least one central processor unit (CPU) and shared memory, said node boards being interconnected to provide access between the central processing units (CPUs) and shared memory on different boards, a method of scheduling a job to said resources comprising: (a) determining a machine map M of the computer system indicative of all of the interconnections of all of the resources in the computer system to which the scheduling system can schedule jobs and storing the machine map M in a topology library unit; (b) periodically assessing a status of the resources and sending status information signals indicative of the status of the resources to the topology library unit; (c) assessing at the topology monitoring unit a free map F of resources indicative of the interconnection of all of resources to which the scheduling unit can schedule a job in a current scheduling cycle; (d) matching resource requirements, including topological requirements specifying at least one interconnection of the resources required to execute the job currently being scheduled, to resources in the free map F which match the resource requirements of the job; and (e) dispatching the job to the matched resources.

In another aspect, a system includes a topology monitoring unit to generate a topology map of a machine where the machine includes node boards in host computers. The topology map is indicative of interconnections of resources of the machine. The topology monitoring unit queries the machine to identify elements of the machine, stores all the elements of the machine in a string array, generates a key for each element as an array of integers where each integer in the array represents an offset into the string array, and generates the topology map of the machine using the generated keys.

Accordingly, one advantage of the present invention is that the scheduling system comprises a topology monitoring unit which is aware of the physical topology of the machine comprising the CPUs, and monitors the status of the CPUs in the computer system and generates a map, referred to in some embodiments as a free map F which is indicative of the interconnection of all of the resources which have a free status, meaning resources to which jobs can be scheduled. In this way, the topology monitoring unit provides current topological information on the CPUs and node boards in the machine based on a two or three dimensional map, which mapping information can be sent to the scheduler in order to schedule the jobs to the CPUs on the node boards in the machine. A further advantage of the invention is that the job scheduler can make a decision as to which resources, such as groups of node boards or CPUs, to send a job based on the current topological information of all of the CPUs. This provides a single decision point for allocating the jobs in a machine having topological properties based on a free map F indicative of the interconnection of all the resources having a free status based on information gathered by the topology monitoring unit for all of the node boards in the machine.

In one embodiment, the status information provided by the topology unit is indicative of the "shape" of free resources, such as CPUs and available node boards. This information can be of assistance to the job scheduler when allocating jobs to the resources to ensure that the available resources can satisfy the requirements of the jobs, as indicated by the topology monitoring unit.

A still further advantage of the invention is that the efficiency of the overall machine having topological requirements can be maximized by allocating the job to the "best" host or domain, which satisfies the quantum of required resources, such as number of available CPUs and/or memory, but also satisfies the shape or topological requirements of the jobs specified for the resources. For instance, in one embodiment, in addition to the job requiring a number of CPUs, the job may specify a particular shape the resources must have to execute the job. For instance, a particular job may specify it requires eight CPUs, but in addition the job may specify that the eight CPUs must be on a certain number of nodes or that there must be a certain number of CPUs per node, and, the job may require the placement of certain CPUs to be contiguous, to use the same CPU indices and/or start from a specific node. Therefore, the job may specify the interconnections or "shape" of the resources. The scheduler can then match the shape requirements of the job against the shape of available resources as indicated by the free map F in order to most efficiently schedule the job to the available resources. Furthermore, any one of the multiple programs can use this optional command and specify the resources and is not restricted to a single programmer.

In a further embodiment of the present invention, the batch scheduling system provides a topological daemon associated with each execution host. In a preferred embodiment, the topological daemon is connected directly to the topological library unit such that the topological library unit is synchronously connected to the topological daemons. This assists the topological library unit to receive the status information signals in order to determine the free map F of the resources as quickly as possible. Furthermore, by having the topological daemons synchronously placed with respect to the topology library unit, time lags in scheduling jobs and the status of the resources can be decreased. Furthermore, should a scheduled job not be able to be executed on a particular host, the topology daemon will advise the plug in topology libraries, preferably in the same scheduling cycle or the immediate next scheduling cycle.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 1 is a topological layout of a conventional KPC machine.

FIG. 2 is a sorted string representation according to one embodiment of the invention of the HPC machine illustrated in FIG. 1.

FIG. 3 is a sorted string array formed by sorting the string representation illustrated in FIG. 2.

FIG. 4 is an illustration of addressing nodes of the machine illustrated in FIG. 1 with the sorted string representation illustrated in FIGS. 2 and 3.

FIG. 5 is an illustration of domain and partition addressing of the machine illustrated in FIG. 1 using the sorted string representation illustrated in FIGS. 2 and 3.

DETAILED DESCRIPTION OF THE PREFERRED EMBODIMENTS

Figure 6:
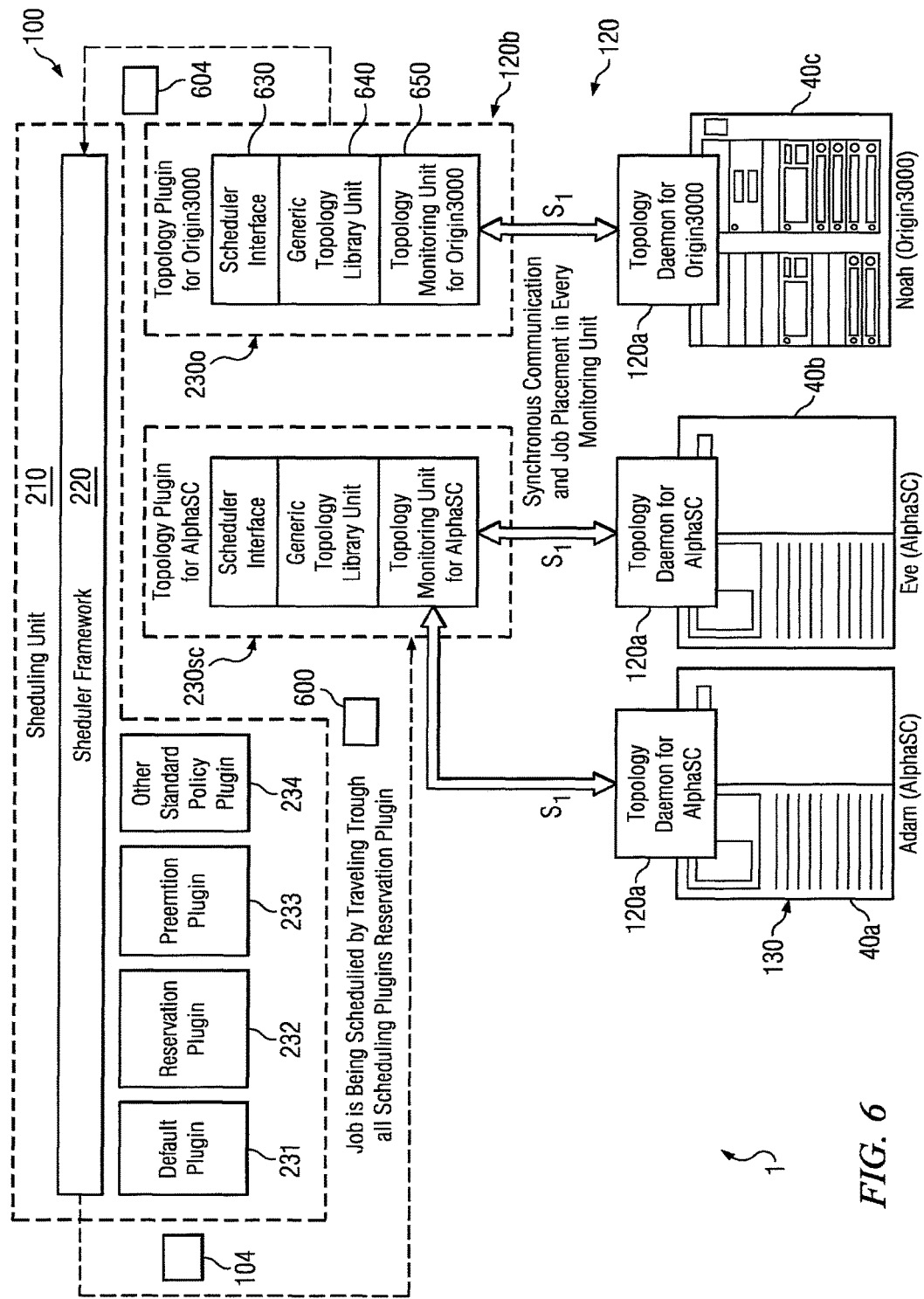
FIG. 6 is a symbolic representation of a job submission through a scheduler according to one embodiment of the present invention.

Preferred embodiments of the present invention and its advantages can be understood by referring to the present drawings. In the present drawings, like numerals are used for like and corresponding parts of the accompanying drawings.

FIG. 1 illustrates the topological layout, shown generally by reference numeral 8 of a conventional HPC machine, shown generally by reference numeral 2 and named, for convenience, "machine trabajo". The machine 2 is incorporated in an overall computer system, shown generally by reference numeral 1. It is understood that the machine 2 shown in FIG. 1 is merely an example of a machine 2 and the present invention is not limited to use with a machine 2 as illustrated in FIG. 1, but rather could be used with any type of machine 2.

As illustrated in FIG. 1, the machine 2 may have a number of hosts 40, identified individually by reference numerals 40a, 40b, 40c and 40d, which are labeled as Scheduler host TRABAJOA, Scheduler host TRABAJOB, Scheduler host TRABAJOC and Scheduler host TRABAJOD. Similarly, the hosts 40 can be further grouped, for ease of scheduling, into partitions 42 such as partitions P1 and partition P2. It is understood that the partitions 42 may be actual or virtual.

Furthermore, the machine 2 can be separated further into CFS domains 44 referred to individually as domain names 44a, 44b, 44c, 44d and also identified for convenience by the name "domain trabajoA", "domain trabajoB", "domain trabajoC" and "domain trabajoD", respectively.

The machine 2 also comprises groups of node boards as shown generally by reference numeral 10. In the embodiment shown by machine 2, the nodes have unique names across the machine, such as "nodes trabajo[0-3]", "nodes trabajo[0-7]", "nodes trabajo[0-11]" and "nodes trabajo[12-15]" and thus hierarchical naming is not necessary. For clarity, only the node boards domain trabajo A are labeled as 10-0, 10-1, 10-2 and 10-3. Furthermore, the boundary partitions 42 can cross the domain names 44 and thus partition/domain addressing is not strictly hierarchical in this embodiment. However, schedule host mapping according to one embodiment of the present invention, requires knowledge of node/domain and node/partition as well as node/topological relationships. The topological relationship of the node boards 10 is illustrated in FIG. 1 and shown generally by reference numeral 8.

The machine 2 illustrated in FIG. 1 as discussed above is an HPC machine. More particularly, the machine 2 may be an HP Alpha Server SC machine consisting of 16 node boards in each domain 44 with each node board 10 having four central processing units 11, 12, 13, 14 as well as shared memory 18. It is understood that node boards 10 will generally have at least one central processing unit (CPU) and may have shared memory or simply have memory associated with the CPU 11, 12, 13, 14. The node boards 10 may also have other resources, illustrated generally by reference numeral 130, such as shared licenses.

Figure 10:
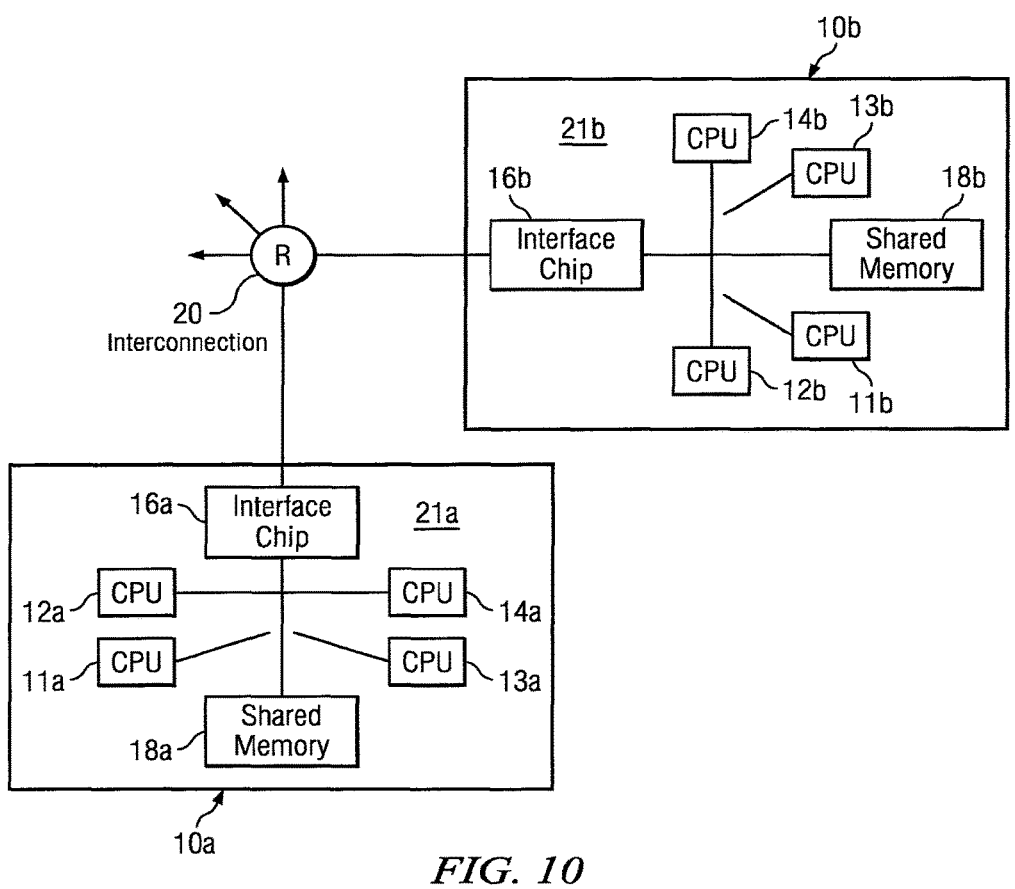
FIG. 10 is a systematic representation of two node boards having an interconnection according to a conventional machine.

FIG. 10 shows a schematic representation of two node boards 10a, 10b and an interconnection 20 as may be used in the multiprocessor topology 8 shown in FIG. 1. As shown in FIG. 10, the two node boards 10a, 10b are connected to each other through the interconnection 20. The interconnection 20 also connects the node boards 10a, 10b to other node boards 10, as shown by the topology 8 illustrated in FIG. 1.

Node board 10a may contain, according to this embodiment, four CPUs 11a, 12a, 13a and 14a, but it is understood that additional CPUs could be present. The node board 10a also contains a shared memory 18a which is present on the node board 10a. Node bus 21a connects CPUs 12a, 14a to shared memory 18a. Node bus 21a also connects the CPUs 12a, 14a and shared memory 18a through the interconnection 20 to the other node boards 10, such as node board 10b shown in FIG. 10. In a preferred embodiment, an interface chip 16a may be present to assist in transferring information between the CPUs 11a, 12a, 13a, 14a and the shared memory 18 on node board 10a as well as interacting with input/output and network interfaces (not shown). In a similar manner node board 10b, includes CPUs 11b. 12b, 13b, 14b interconnected by node bus 21b to shared memory 18b and interconnection 20 through interface chip 16b. Accordingly, each node board 10 would be similar to node boards 10a, 10b in that each node board 10 would have at least one CPU 12 and/or 14, shared memory 18 on the node board 10, and an interconnection 20 permitting access to the shared memory 18 and CPUs 11, 12, 13, 14 on different node boards 10.

It is understood that the topology 8 of machines 2 may change such as with the number of central processing units (CPUs) or processors 12, 14 per boards, the amount of shared memory 18 per board 10 and the interconnection 20 of the boards 10. Furthermore, it is understood that certain machines 2 permit additional node boards 10 to be added and/or additional CPUs or processors to be added to existing node boards 10.

It is apparent that the processors 11a, 12a, 13a, 14a on node board 10a have uniform access to the shared memory 18a on node board 10a. Likewise, processors 11b, 12b, 13b, 14b on node board 10b have uniform access to shared memory 18b. While processors 11b, 12b, 13b, 14b on node board 10b have access to the shared memory 18a on node board 10a, processors 12b, 14b can only do so by accessing the interconnection 20, and if present, interface chip 16a and 16b.

It is clear that the CPUs 11, 12, 13, 14 accessing shared memory 18 on their local node board 10 can do so very easily by simply accessing the node bus 21. This is often referred to as a local memory access. The processors 11a, 12a, 13a, 14a on the same node board 10a may be considered contiguous because they can both access the memory 18 without encountering an interconnection 20, which would include an inherent latency. When a CPU 11, 12, 13, 14 accesses memory 18 on another node board 10, that access must be made through at least one interconnection 20. Accordingly, it is clear that remote memory access is not equivalent to or uniform with local memory access. Furthermore, in some topologies, more than one interconnection 20 may be encountered depending on which two node boards 10 are exchanging data which affects the speed, band width and latency messaging of the remotely located boards 10. Thus, a variable latency time is encountered when CPUs 11, 12, 13, 14 send messages or access memory 18 on different node boards 10 or access memory residing in a CPU 11, 12, 13, 14 in another node board 10 resulting in access between processors 11, 12, 13, 14 and/or shared memory 18 on different node boards 10 being non-uniform.

It is understood that even in cases where the machine 2 is not a non-uniform memory access machine (NUMA) or does not even have a cross-node board 10 access at all, the interconnections 20 and topology 8 may still affect the execution of a job 104. For instance, the interconnection 20, as is sometimes the case with Alpha SC type machines, may simply be responsible for providing a message passing interface (MPI) between individual nodes 10. Depending on the interconnect 20, both latency and bandwidth of the interface across an interconnection 20 will be affected by the placement of the job 104 on the connected nodes 10.

It is understood that the host or module 40 may have many processors 11, 12, 13, 14 located on a number of boards. In other words, while the physical topology, shown generally by reference numeral 8 illustrates selected boards 10 on the host 40, it is understood that other machines 2 may have other topologies 8. For instance, the Silicon Graphics™ Origin Series of multiprocessors can accommodate up to 512 node boards 10, with each node board 10 having at least two processors 12, 14 and up to four gigabytes of shared memory 18. This type of machine allows programmers to run massively large parallel programs with very large memory requirements using NUMA architecture.

Furthermore, in a preferred embodiment of the present invention, the different topologies 8 shown in FIG. 1 can be used and changed dynamically. In other words, the node boards 10 can be arranged in different groups or topologies 8. Jobs can be allocated to these different possible groups or topologies 8 depending on the job requirements. Furthermore, as illustrated in FIG. 1, the groups of boards 10 can be located on separate hosts 40.

It is understood that the larger number of interconnections 20 required to communicate between node boards 10, the greater the latency required to transfer data. This is sometimes referred to as the radius between the CPUs 11, 12, 13, 14 or the node boards 10 when only one dimension or distance between node boards 10 is considered. However, more generally, the interconnection 20 and therefore the resulting latency, may be referred to as the "shape" in two or three dimensions of the various node boards 10 in the machine 2. For a radius of "0", no interconnections 20 are encountered when transferring data between particular node boards 10 because, for instance, all the CPUs 11, 12, 13, 14 executing a job are located on a single node board 10. For a radius of 1, only one interconnection 20 is located between processors 11, 12, 13, 14 executing the job. For instance, in FIG. 10, the radius from node board 10*a* to node board 10*b* is 1 because one interconnection 20 is encountered when transferring data from node board 10*a* to node board 10*b*.

For a radius of two or more, two or more interconnections 20 are encountered for transferring data between a first node board 10 and another node board 10. It is apparent that when the radius between the node boards increases beyond 1, the "shape" of the resulting node boards 10, which are interconnected together will change. While referring to the radius of the numbered node boards 10 is useful in determining the maximum or outer distance between two of the node boards 10, it is apparent that the shape of the node boards 10 within a given circular or spherical radius will differ depending on the topology 8 and the resources 130 being used in the machine 2 by other jobs.

To accommodate various shapes of node boards 10, in one preferred embodiment of the present invention, the topology 8 of the machine 2, as well as other machines, could be determined and represented as a set element. Set elements are created, for instance, to represent each CPU 11, 12, 13, 14 on each node board 10 within the machine 2. In this way, the topology 8 of the machine 2 can be mathematically represented. Such a mathematical representation can be referred to as the machine map M which essentially represents a sorted superset of all the nodes 10 within the machine 2. As such, the machine map M or machine topology map M is indicative of all of the interconnections 20 of the resources 130, such as the processors 11, 12, 13, 14 and shared memory 18 as well as licenses and other resources, in the overall computer system or machine 2 to which jobs 104 will be scheduled.

While the machine map M can be represented in any number of ways, in a preferred embodiment, the machine map M may be represented by way of set elements. When constructing a set element representation of a machine 2, according to one preferred embodiment, the following conditions may be placed on the set keys:

(i) the keys must be unique;
(ii) the keys must allow the addressing down to a single CPU;
(iii) the keys must allow the "level" addressing, such as "all nodes in the, domain", or, "all CPUs in the partition", or, "all routers under this meta-router";
(iv) the keys must be orderable (this is an important efficiency requirement: set union of two unordered sets of M and N elements is calculated with M*N comparisons, set union of ordered sets is calculated with M+N comparisons using the tape merge algorithm); and
(v) the keys must allow for an efficient comparison operation.

These set keys for constructing a set representation of the machine 2 may be satisfied by a number of schema. In a preferred embodiment, the following is one possible schema that satisfies requirements (i) to (v):

(a) The topology of the machine is queried and all its elements are stored in a string array.
(b) The key is constructed as array of integers.
(c) Each integer in the array represents the offset into the string array.
(d) The lowest representation level is a node 10, for example, one level above from the CPU 12, 14 level.
(e) CPUs 12, 14 may be represented by a bit-mask, since any conceivable architecture CPU located on the same motherboard are preferable to any other CPUs.
(f) The full key consists of the string index array and CPU bit-mask.
(g) The full comparison function always starts from the "top" element of the string index array, and down to the zero level, e.g. "node" level, and then compares the bit-mask.
(h) The "level" comparison functions stops at the specified level.

Accordingly, the above schema is one preferred embodiment of a method to represent any machine 2, such as the machine 2 illustrated in FIG. 1, as a finite ordered set. While the topology 8 of a machine 2 significantly varies from one machine to another, in any machine there is a unique path from the machine named to each individual node 10. Thus, the above schema is a sufficiently generic method to facilitate representing any machine 2 by means of a finite ordered set.

Once the topology 8 of the machine 2 is represented as a finite ordered set, the machine topology map M may be created as a sorted set of all of the nodes 10 that belong to the machine 2 at the moment that the map is created. It is understood that the machine topology map M preferably represents all of the nodes 10 in the machine 2 at the time that the machine topology map M is created. It is also understood that the machine topology map M may need to be updated each time that the physical machine 2 is changed. In other words, the machine topology map M may be considered a set "universe" in mathematical terms of the machine 2 which is indicative of the interconnections 20 of the resources 130 and the computer system or machine 2 to which jobs 140 may be scheduled. As discussed further below, the machine topology map M is used primarily as a template for creating the free map F which represents the topology of the machine 2 which is "free" or has resources 130 to which a particular job 104 may be allocated at a particular moment in time.

The machine topology map M as discussed above, may be constructed by querying the specific machine 2, such as the HPC machine 2 illustrated in FIG. 1, and listing all of the nodes 10 as elements with their full keys as identifiers. The machine topology map M can then define the sorting rules in the order of the map.

By way of example, the machine topology map M will be created for the machine 2 of the computer system 1 illustrated in FIG. 1. As shown in FIG. 1, the machine 2, also labeled as "trabajo", consists of 16 ES45 nodes 10, also identified as trabajo[0-15]. There are four CFS domains 44, namely trabajo[A, B, C and D] have been partitioned into two partitions, namely P1 and P2. In this particular machine 2, the nodes 10 will generally have four processors per node 10, but it is understood that other machines will have other numbers of CPUs.

Generally, the computer system 1 will comprise more than one machine 2. In such a case, the maximum addressing level is four and the levels are indexed in sequence such as node 10 (index 0), domain 44 (index 1), partition 42 (index 2) and machine 2 (index 3).

Accordingly, using the above schema, in traversing the machine 2 from left to right, a full path to every node 10 may be constructed using the sorted string representation, as shown generally by reference numeral 320 in FIG. 2.

Generally, unique strings will form the string array representing the machine topology map M. For the example of the machine 2 illustrated in FIG. 1, the array may consist of 23 elements in total, namely one machine name, two partition names, four domain names and 16 node names as illustrated, for example, in FIG. 3 by reference numeral 330.

For ease of mathematical manipulation, a four-segment numeric key, as shown generally by reference numeral 350 in FIG. 4, may be used instead of a string key 360 in order to uniquely identify the path and therefore topology 8 of each of the node boards 10 of the machine 2. As illustrated in FIG. 4, each node board 10 identified by the names trabajo0-trabajo15 have a string key which identify their location in the machine 2, including the path to the node board 10 and this string key 360 can be represented by a four-segment numeric key 350.

In addition to the four-segment numeric key 350 used to address the nodes 10 as illustrated in FIG. 4, each of the levels may be addressed using level addressing. In the preferred embodiment, level addressing may be achieved by using a notation of a wild card key, such as the number "−1" which may represent an invalid array offset. Therefore, as illustrated in FIG. 5, the CFS domain trabajo C is represented at line 381, both by the string representation 382 and by the numeric representation 383. Similarly, the partition P1, identified by reference numeral 391 in FIG. 5, is identified by the string representation 392 and by the numeric key 393 illustrated in FIG. 5.

Using the above string keys 360 and numeric representations 383, a sorted superset of all of the node boards 10, namely trabajo0 to trabajo15, with their full numeric keys can be created to indicate the machine topology map M corresponding to the topology 8 of the trabajo machine 2 illustrated in FIG. 1. The string array 360 of the entire machine 2 may represent the context, or set "universe" in mathematical terms, in which the machine topology map M for the topology 8 of machine 2 can exist.

It is understood that the machine topology map M need not be restricted to the physical entity such as a CFS domain 44 or partition 42. Rather, the machine topology map M, in a preferred embodiment, may also be accounted for by the configuration, which is in one embodiment simply a name that defines a specific partition layout that can be active at certain time periods and inactive at others. Although the term configuration can be an abstract concept, and does not have any direct representation on the machine topology map M, it can still be used in the above-noted schema thus allowing submitting jobs for one configuration when another configuration is not active. Such jobs will be left pending until their requested configuration becomes active again.

Reference will now be made to the job scheduling system, as shown generally by reference numeral 100 in FIG. 6 which can be used to schedule jobs 104 to the resources 130 represented generally by the hosts 40a, 40b and 40c illustrated in FIG. 6.

FIG. 6 illustrates a job scheduling system 100 according to one embodiment of the present invention for scheduling a job 104 to resources 130. As illustrated in FIG. 6, the job scheduling system 100 may comprise a scheduling unit 210. The job scheduling unit 210 may further comprise a scheduler framework 220, which comprises the general scheduling hardware and software for allocating jobs 104 to the resources 130. The scheduling unit 210 may also optionally contain plugins such as default plugin 231, reservation plugin 232, pre-emption plugin 233 and other standard policy plugins 234.

It is understood that the scheduler framework 220, as well as the plugins 231-234 will create a candidate host list 600 indicating the resources to which the job 104 may be allocated using the scheduling policy of the scheduling unit 210. It is understood that while the scheduling unit 210 is shown as having several components such as the scheduler framework 220 and the plugins 231-234, the scheduling unit 210 could have any internal design. Use of the plugins 231-234, however, has been found to be more efficient in customizing the scheduler framework 220 for different environments. For instance, if a particular computer system 1 has a unique reservation, pre-emption or other standard policies, rather than re-designing the scheduler framework 220 of the scheduling unit 210 to accommodate the unique policies of each computer system 1, the reservation plugins 231-234 can be revised. This decreases the amount of time required to customize a scheduling unit 210 for any particular computer system 1 regardless of the scheduling policies to be used by the individual computer system 1. Nevertheless, the scheduling unit 210 could be comprised of a single scheduler framework 220 without any plugins as may be optionally designed.

It is understood that the candidate host list 600 generated by the scheduling unit 210 will essentially be a list representing resources 130 in the host 40 available to execute the job 104 based on the resource requirements of the job 104 to be scheduled. However, it is understood that the candidate host list 600 will essentially be a list of the resources 130 and will not generally reflect the interconnection of the resources 130.

The scheduling system 100 also comprises a topology component, indicated generally by reference numeral 120. In the preferred embodiment, as illustrated in FIG. 6, the topology component 120 may preferably have a first host part 120 residing on the hosts 40 and a second scheduler part 120b residing on the scheduling unit 120. The first part 120a may generally take the form of a topology daemon 120a residing on each of the hosts 40 and will generally monitor the status of the resources 130 in each of the hosts 40a, 40b, 40c that the topology daemons 120a reside. The topology daemons 120a may also generate status information signals ST indicative of the status of the resources 130 on the corresponding hosts 40a, 40b, 40c. For convenience, the hosts 40a, 40b, 40c in FIG. 6 are also labeled as Adam (AlphaSC), Eve (AlphaSC) and Noah (Origin3000). The status information signal $S_1$ will be sent to the second part 120b of the topology component 120 residing on the scheduling unit 210. The topology daemons 120a may also optionally receive the job 104 being scheduled by the scheduling unit 210 and send back the completed tasks to the scheduling unit 210.

The second part 120b of the topology component 120 residing in the scheduling unit 210 will generally receive the status information signals S1 as well as the candidate host list 600. Preferably, the second part 120b of topology component 120 comprises a topology library unit 640 which includes a machine map M of the computer system 1 including the hosts 40.

As illustrated in FIG. 6, the second part 120b of the topology component 120, which resides on the scheduling unit 210 may comprise separate plugins identified by the reference numerals 230sc and 230o. It is understood that the plugins 230sc, 230o are created for convenience and ease of adapting the scheduling unit 210 to different types of hosts 40, similar to the rationale for creating the plugins 231, 232, 233, 234 forming part of the scheduling unit 210. For instance, the embodiment illustrated in FIG. 6 comprises a separate plugin for each type of host 40 contained within the computer system 1, such as a separate topology plugin for and AlphaSC type host, shown generally by reference numeral 230sc, and another plugin for the Origin3000 type host 40, as shown generally by reference numeral 230o. It is understood that having separate plugins for each type of host 40, or each host 40, is a matter of convenience and the present invention would encompass other ways of designing the second part 120b of the topology component 120 residing on the scheduling unit 210. For instance, the second part 120b of the topology component 120 may consist of a single unit, which is separate or combined with the scheduling unit 210. The advantage of having plugins 230sc and 230o is that plugins maybe designed once for particular types of host computers 40 and they can be easily inserted on each scheduling unit 210, which will be used in a computer system 1 having the same types of host computers 40.

In general, the topology plugins 230sc, 2300, or any other type of second part 120b of the topology component which reside on the scheduling unit 210 will perform similar functions, such as having a scheduler interface, as shown generally by reference numeral 630, a topology library unit, shown generally by reference numeral 640 and a topology monitoring unit, shown generally by reference numeral 650. It is understood that the scheduler interface 620 will interface with the scheduling unit 210 and, if the plugins 230sc, 230o are integrally formed with the scheduling unit 210 may not be present.

The topology library unit 640 will generally comprise the machine map M indicative of the interconnections 20 of the resources 130 in the computer system 1 to which the scheduling system 100 can schedule jobs 104. In the case, as illustrated in FIG. 6, where separate plugins 230sc, 230o are created for separate types of hosts 40, the topology library unit 640 will contain the machine map M for the corresponding host 40. In other words, the topology library unit 640 will comprise a generic map, which can then be easily customized for the particular machine map M for the corresponding resources 130 of the computer system 1 as discussed above.

Likewise, the topology monitoring unit 650 residing on the second part 120b of the topology component 120 will interface with the corresponding topology daemons 120a on the corresponding host 40 to which the topology library unit 640 has the machine map M. As illustrated in FIG. 6, the topology monitoring unit 650 and the AlphaSC topology plugin 230sc will have an AlphaSC topology library unit 640 comprising a Machine map M indicative of the interconnections 20 of the resources 130 in the computer system 1 for which the topology plugin 230sc corresponds to, which in this case are labeled Adam AlphaSC and Eve AlphaSC or hosts 40a, 40b. Similarly, the topology plugin for Origin3000 230o will have an Origin3000 topology library unit 640 comprising a machine map M indicative of the interconnections 20 of the corresponding resources 130 in the computer system 1, namely the host indicated as Noah (Origin3000) and also identified by reference numeral 40c. The topology monitoring unit 650 in the topology plugin 230o will also interface with the corresponding topology daemon 120a residing on the Noah (Origin3000) host 40c and receives status information signals $S_1$ from the topology daemon 120a residing on host 40c. If the status information signals $S_1$ may be lists of the resources 130 and their corresponding addresses, then the topology plugins 230 can convert this information to a map representing the status of the resources 130. The status of the resources 130 could, for instance, be allocated (executing a job) free (meaning available to execute a job and depending on the host 40, also include resources 130 which were executing a job, but has now become suspended) and resources 130, which occur, for instance, if a CPU 11 or node board 10 or interconnection 20 has failed). Otherwise, the status information signals S1 may have generic or rudimentary mapping information, such as the location of the CPU 11, 12, 13, 14 on a particular node board 10, which can then be transferred by the topology plugin 230 into more useful information to assist the topology library unit 640 to generate a free map F of available resources 130.

During operation, the topology library unit 640, whether it is part of separate plugins 230sc, 230o or as part of an overall second part 120b of the topology component 120, will receive the candidate host list 600 from the scheduling unit 210 representing the resources 130 on the host 40 available to execute the job 104 based on the resources required to execute the job and the scheduling policies of the scheduling unit 210 as well as the status information signals $S_1$ from the first part 120 of the topology component and determine a free map F of resources 130 to execute the job 104 being scheduled. The free map F will be indicative of the interconnections 20 of the resources 130 to which the job 104 in the current scheduling cycle can be scheduled based on the status information signals $S_1$, the candidate host list 600 and the machine map M which is stored in the topology library unit 640. In other words, the available resources 130 for executing the job 104 based on both the scheduling policy, which is indicated by the candidate host list 600, the resources 130 available based in part on information received from the status information signals Si and the mapping of the resources available based on the machine map M will be used to map the resource mapping requirements of the job 104 which can include the shape 106 of the resources as specified by job 104, to the shape of the available resources 130, as indicated from the free map F.

Figure 7:
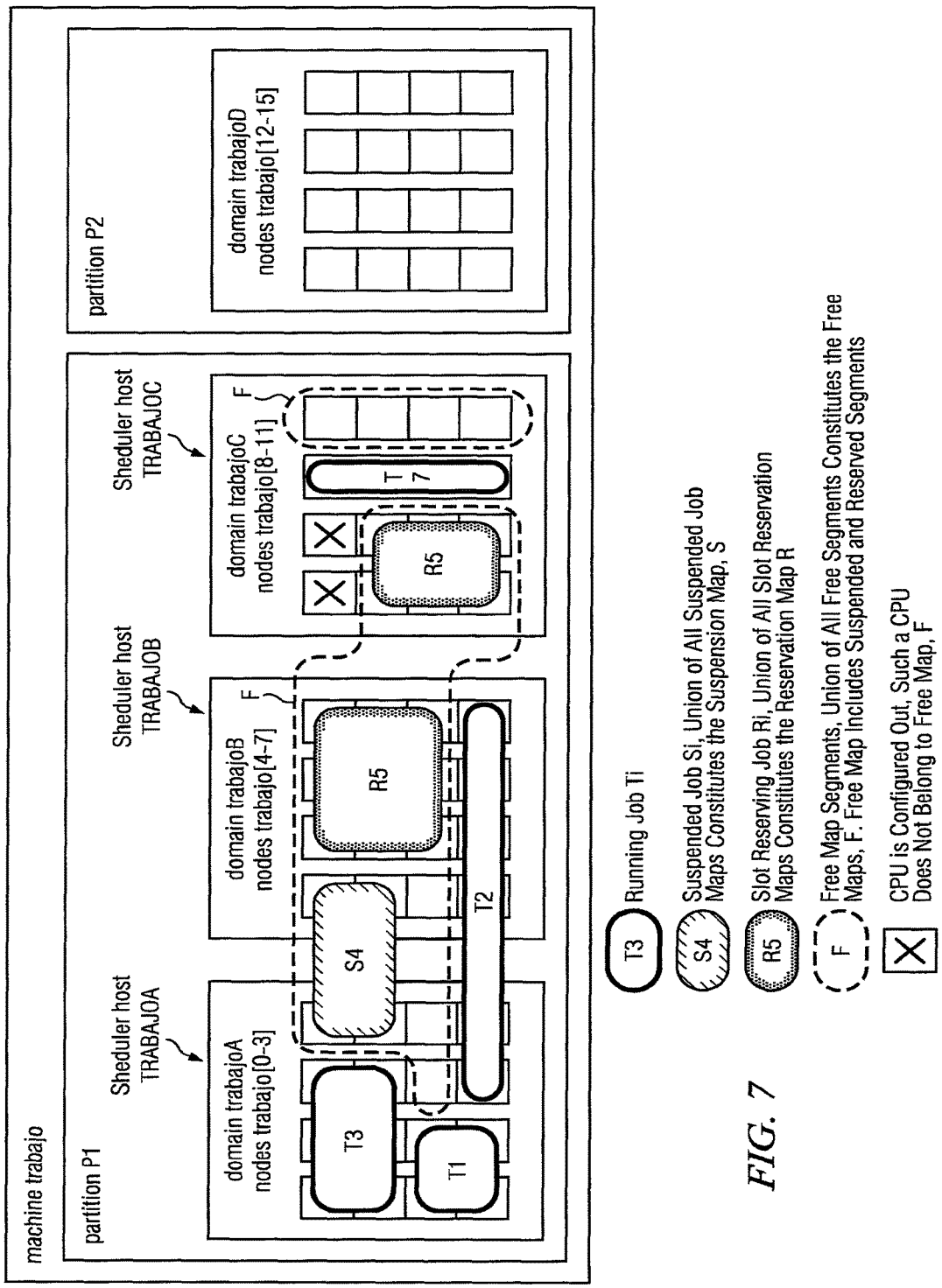
FIG. 7 is the topological representation of the conventional HPC machine shown in FIG. 1 with an illustration of the state of the topology according to one embodiment of the present invention.
Figure 8:
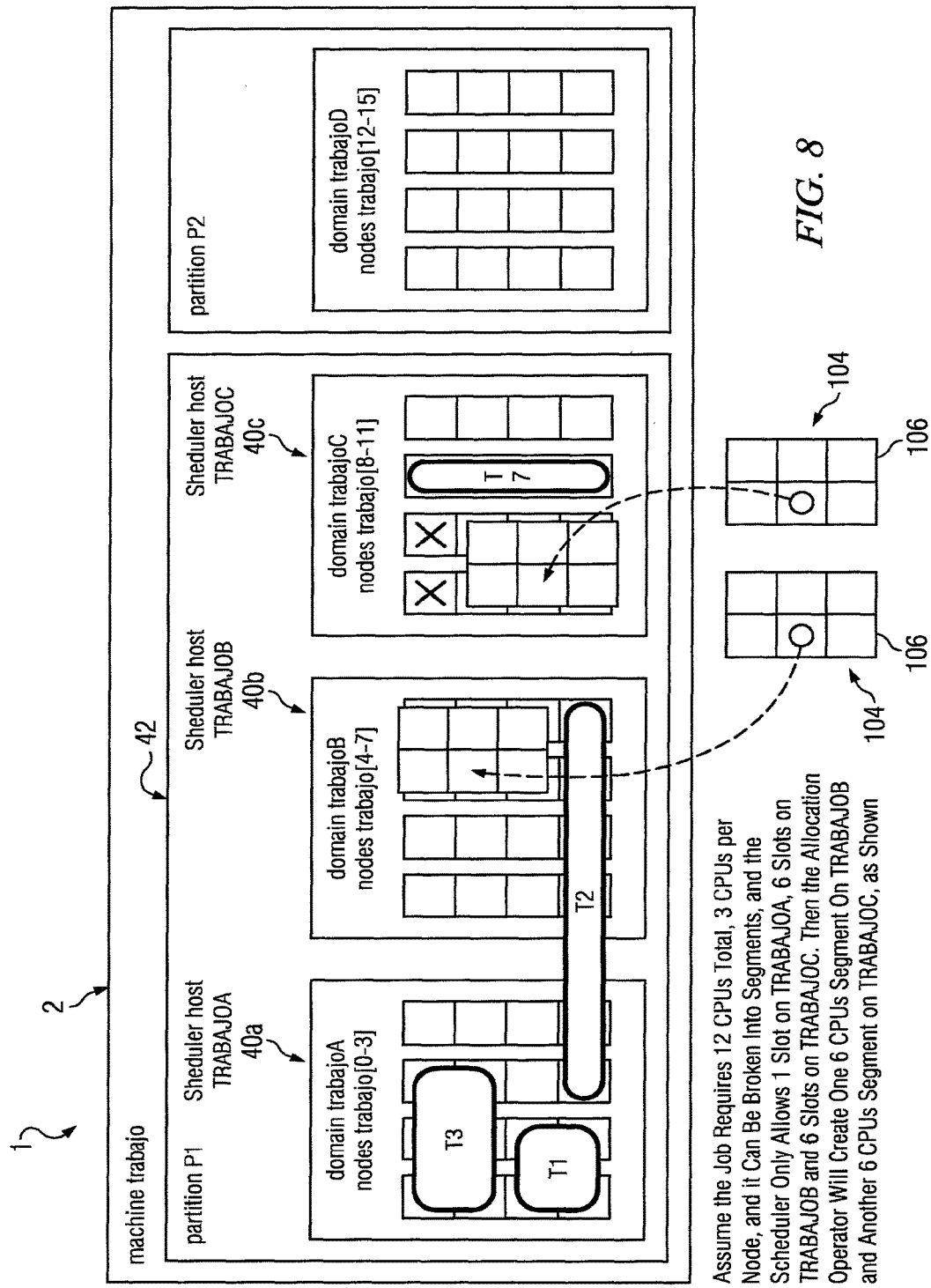
FIG. 8 is a symbolic representation of the topological representation illustrated in FIG. 7 illustrating an allocation calculation on a three host machine according to one embodiment of the present invention.
Figure 9:
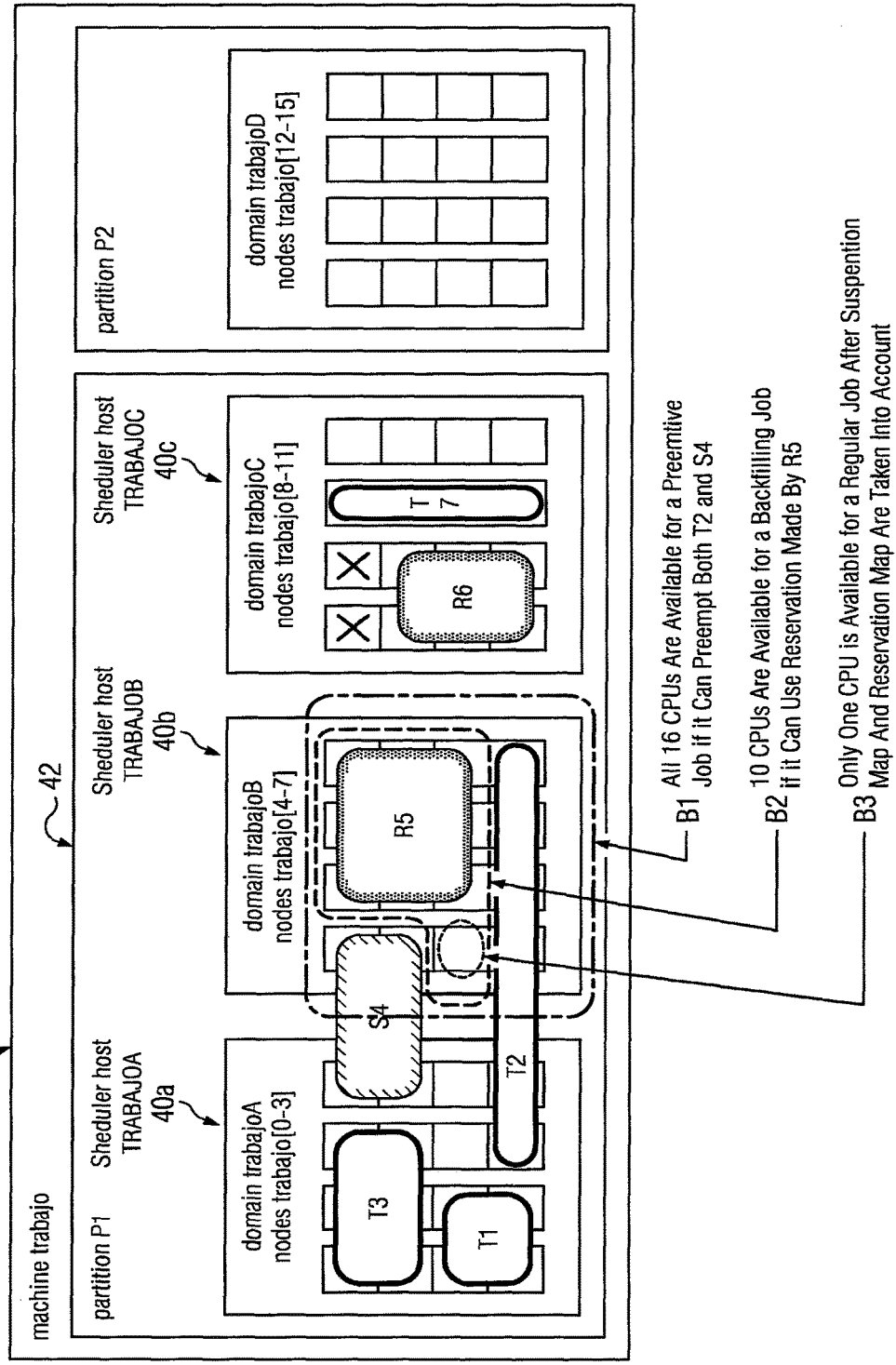
FIG. 9 is a symbolic representation of the topological representation illustrated in FIG. 8 illustrating forming a host map for regular, backfilling and pre-emptive jobs.

FIGS. 7, 8 and 9 illustrate the scheduling process according to one embodiment of the present invention based on the computer system 1 illustrated in FIG. 1 and which may use the scheduling system 100 illustrated in FIG. 6. It will be appreciated that once set elements representing the machine map M are created for each of the hosts 40 in the computer system 1 and stored in the topology monitoring unit 120, then that machine map M can be used to match the resource mapping requirements 106 of the job 104 to be scheduled with the free map F.

How the particular resource mapping requirements 106 of a job 104 is mapped to the free map F can be performed in a number of ways depending on the specific manner in which the machine map M is represented, the algorithm being used to match the shape requirements 106 of the job 104 as specified by the resource mapping requirement, and the free map F representing the available resources for that particular job 104. It is understood that the resource mapping requirements of a job 104 comprises the shape requirements, including the physical interconnections 20 of some of the resources 130 required to execute the job 104 in at least two dimensions and possibly three dimensions. Therefore, once the topology unit 640 receives the resource mapping requirements 106 of the job 104 which comprise the shape requirements 106 corresponding to the job 104 to be scheduled, the shape requirements 106 of the job 104 are matched to the portion of the resources 130 in the free map F for the particular job 104 which matches the shape requirement of the job 104.

The following is an example of how this can be accomplished according to one preferred embodiment using specific equations and algebraic notation as would be understood by a person skilled in the art. However, it is understood that the following is simply one example of how the mapping algorithm from mapping the shape requirements 106 of a job 104 to the free map F can be accomplished. It is also understood that the present example will utilize non-trivial scheduling such as reservation, backfilling and pre-emption of jobs being executed by the resources 130 and these are being presented as examples only. For greater clarity, it is understood that while the present example will illustrate a combination of various non-trivial scheduling including reservation, suspension and pre-emption that these types of non-trivial scheduling need not be performed together and could be combined with other forms of non-trivial scheduling.

The following example will be based on an algebraic operations utilizing a machine map M generated as discussed above an illustrated in FIGS. 2 to 5. It is understood that other types of machine maps M could be created and therefore the algebraic operations may differ accordingly. In general, both free and consumed resources in the machine map M will be generally represented in the scheduler by plain numbers. The scheduling unit 210 will create the candidate host list 600 based on these numbers. It is also understood that these numbers may be updated by the status information signals $S_1$ received from the topology daemons 120a. When a free map F defining the resources available for the location of a particular job is generated, an architecture-specific allocation algorithm can then be applied to the free map F to define a specific shape of the resources 130 in the free map F to which a job 104, which also has shape requirements 106, can be allocated. In terms of the said algebraic notation, the allocation operator defines a subset that is built according to the rules that specify the allocation shape of the job 104. The details of implementing the specific scheduling policies may vary from one scheduling system 100 to another, however, the following general translation principles can be applied to accomplish this according to one preferred embodiment of the invention.

For convenience, without limiting the scope of the invention, the following symbols for denoting set algebra operations will be used in this description:

$\cup_{k=1,K}( \ldots )$—set union of the elements in the brackets, indexed by "k";

$A \cup B$—set union of A and B;

A+B—"full" set union of two elements, where resulting set is restricted by boundaries of the left set A and only bitmasks are logically OR-ed together;

$A \cap B$—set intersection of A and B; and

A\B—set difference of A and B

It is also understood that the above algebraic operations could be explained by Venn diagrams, but this shall not be reproduced herein.

Using the above notation, the following sets can be maintained:

M, Machine Map—overall machine map, or set universe;

F, Free map F—the map of currently available (free) CPUs;

$A_i$, Job Allocation Map—the map of CPUs allocated for job I;

R, Reserved Map—the map of all outstanding reservations;

S, Suspension Map—the map of all suspended jobs;

Z( . . . )—allocation or placement algorithm calculation subset operator; and

H( . . . )—host map subset operator.

It is understood that the above sets M, F, A, R, H and S may represent maps in 2 or 3 dimensions that reflect the corresponding resources 130 having the corresponding status. In this context, "map" refers to the shape as reflected by the actual topology 8 and the term list, such as the candidate host list 600 referred to above, will generally represent a list of resources 130 without necessarily reflecting the interconnections 20 from the actual topology 8.

FIG. 7 illustrates an arrangement of the above maps at an arbitrary moment of a computer system 1 illustrated in FIG. 1 and labeled as TRABAJO. In FIG. 7, for convenience, only partition P1 is made known to the scheduling unit 210, but it is understood that partition P2, as well as other hosts and/or petitions could also form part of the overall computer system 1 to which jobs 104 may be scheduled. As illustrated in FIG. 7, with only partition P1 active, the scheduling system 100 will see the partition P1 divided into three hosts, namely 40*a* labeled as TRABAJOA, 40*b* labeled as TRABAJOB and 40*c* labeled as TRABAJOC, which also correspond to the domains 44 domain TRABAJOA, domain TRABAJOB and domain TRABAJOC.

The placement algorithm Z, as will be understood by a person skilled in the art, may be unique for each type of topology 8 and/or computer system 1. However, a more generic version of the placement algorithm according to a preferred embodiment of the invention will have the following inputs:

C, Candidate Host Map—a subset of Free Map;
L, Host Slot Limit—taken verbatim from the scheduler request;
N, CPU range—taken from the scheduler request, but may be modified; and
T, Topology string—taken verbatim from the scheduler request.

It is understood that the inputs L host slot limit, N CPU range and T topology string may be scalar values and mapping values, but they will generally represent resource mapping requirements 106 of a job 104. It is understood that the resource mapping requirements may be represented in other ways also.

The placement algorithm will preferably produce a job allocation map $A_i$ as an output. The job allocation map $A_i$ will represent the resources 130 which satisfy the shape requirements for a particular job 104, also indicated as $A_i$ in the equations, based on the free map F for the job 104 being scheduled. It is apparent that the actual number of CPUs allocated to a particular job 104, as well as other resources, can be determined from the candidate host list 600 for the particular job 104, but the candidate host list 600 would not necessarily indicate the interconnections 20 of the resources 130.

In one preferred embodiment, the allocation map $A_i$ can be transformed into an array of allocation requests to be carried over by the allocation placement routine. Symbolically, the notation for such a request can be as follows:

$$A_i^j = Z(C_i^j, L_i^j, T_i, N_i) \qquad \text{EQ 1}$$

where A represents the allocation map for host j and job i;
L taken verbatim from the scheduler request;
Z allocation or placement algorithm calculation subset operator
I
N, CPU range—taken from the scheduler request, but may be modified
T, Topology string—taken verbatim from the scheduler request It is understood that the allocation map $A_i$ shown in equation EQ 1 is for a particular host 40 denoted by j. If the job i can be executed by a single host 40. In this case, the equation 1 will show an allocation of job I to a single host j. Otherwise, equation 1 will have a separate component for each host j. The complete job allocation map for all of the hosts 40 $A_i$ for a particular job i can therefore be defined as a set union of all host allocation maps $A_i$ as follows:

$$A_i = \cup_{j=1,N}(A_i^j) \qquad \text{EQ 2}$$

where A represents the allocation map for host j and job i;

Accordingly, in one embodiment, equation EQ2 represents all of the resources 130 allocated to a job 104 denoted by I across all of the hosts 40 denoted by j. It is understood that the allocation map A will be a subject of the free map F which is a subset of the machine map M. In the special case where the job 104 is allocated, all of the available resources 130 in a machine 2, the allocation map $A_i$ for that particular job 104 will coincide with the free map F, but this would be unusual. Similarly, the free map F will coincide with the machine map M if all of the resources 130 are available for executing jobs 104, but this also would be unusual at least because a node 10 may have failed and/or resources 130 have been allocated to jobs 104 not submitted by the scheduling unit 210 such as system maintenance jobs (not shown).

FIG. 8 illustrates how the allocation calculation operator, according to one preferred embodiment, could place a job 104 having a defined shape requirement, shown generally by reference numeral 106, onto a free map F of the machine 2. As illustrated in FIG. 8, and comparing FIG. 8 with FIG. 7, it is apparent that the running jobs T1, T2, T3 and T7 are continuing to run and are not interrupted. The suspended job S4 is within the free map F indicating that it is available for allocation to the particular job 104. It is also apparent, from a comparison of FIG. 8 and FIG. 7, that the resources 130 available for allocation in FIG. 8 correspond to the union of the free map F segments identified by the dashed line in FIG. 7 and also labeled as F representing the free map. It is understood that the free map F may include resources 130 which are reserved for other jobs and labeled as R5 and R6, but which larger jobs are not yet being run. The reserved resources R would be available for the free map F as a result of the scheduling policies of the scheduling unit 210 identifying the resources as available for backfill by the job 104. Should the job 104 not permit backfill, or, should the reserved resources R not be suitable for backfilling for job 104, then these reserved resources R5, R6 would be removed from the free map F.

FIG. 8 indicates that there are at least two locations in the Free map F of available resources 130 which can accommodate the shape 106 of the job 104. For instance, the shape 106 of the job 104 illustrated in FIG. 8 requires 12 CPUs in total with at least three CPUs per node 10 and it can be broken down into segments. If the scheduling unit 210 only allows two CPUs on domain trabajoA, six CPUs on domain trabajoB and six CPUs on domain trabajoC, then the allocation operation will preferably create six CPU segments on trabajo B and another group of six CPUs on trabajo C, as illustrated, for instance, in FIG. 8. While it is apparent that the free map F has several combinations of a total of six CPUs, the shape requirements 106 of the job 104 dictate that a subset of the total number of node boards 10 in the free map F can satisfy the shape requirements 106 and therefore would be preferred for execution of job 104.

It is apparent that all of the inputs in the equations indicated above, except for the candidate host map $C_j$ can be generated and/or defined by the scheduling unit 210. For instance, $L^j$ represents the host slot limit, $N_i$ represents the CPU range and $T_i$ represents the topology each for job i, which are generally taken verbatim from the scheduler unit 210, but may be further modified. This leaves the candidate host map $C_i^j$ which can be determined, in one embodiment, by the host translation schema, or, host map subset operator H. The host translation schema H will generally be unique for any type of computer system 2, as discussed above, however, there will be a common interface definition. This operator produces a set that describes any particular host 40, indicated by index j, out of the free map F as follows:

$$C_j = H(F, j) \qquad \text{EQ 3}$$

It is understood that equation 3 will represent the free map F for a particular host $C_j$, in the generic form and not for a specific job 104. In particular, when a job is suspended, its resources 130 would be reported as free and included in $C_j$ of equation 3. For instance, in one embodiment, the status information signals $S_i$ may indicate both resources 130 which are free and which are suspended as being free. However, in fact, the suspended resources 130 will not be available to any job 104, but rather will only be taken by a job having a sufficiently high priority as determined by the scheduling policy of the scheduling unit 210. For instance, in FIGS. 7 and 8, suspended job S4 is included within the free map F shown by dashed lines because the particular job 104 being scheduled has a sufficiently high priority to warrant using the suspended resources S4, but this may not always be the case.

To define a candidate host map $C_i^j$ for a specific job 104, indicated by index i, the host translation schema H would need to take into account the global suspension map S and the global reservation map R representing jobs which have been suspended and/or reserved. In particular, the candidate host map $C_i^j$ would then need to be modified for any particular job 40, indicated by index i by including only the suspended jobs S which can be pre-empted for the particular job 104 being scheduled, and similarly by including only the reserved jobs $R_i$ that can be backfilled for a job i.

The following equation 4 illustrates the calculation for a candidate host map $C_i^j$ for a particular job 104 removing the suspended jobs S and also removing the reserved resources R:

$$C_i^j = C_j \backslash R \backslash S = H(F,j) \backslash R \backslash S \qquad \text{EQ 4}$$

where $C_i^j$ represents the candidate host map for host j and job i;
$C_j$ represents the candidate host map for host j.
R represents a map of reserved resources; and
S represents a map of suspended resources.

For a particular job I, some individual maps may allow for backfill (R) and pre-emption $S_i$) be added back as in the following equation:

$$C_i^j = H(F,j) \backslash S \backslash R + U_i = 1, N(S_i) + U_i = 1, N(R_i) \qquad \text{EQ 4-A}$$

Accordingly, the equation 4, the host translation schema H will have a map of all of the resources 130 shown as being free, which would include resources that are suspended or reserved because there is technically no physical distinction between a resource 130 which is actually free or suspended. To calculate the candidate host map for a particular job i, all of the suspended resources 130, illustrated by the global suspension map shown by S will initially be removed or subtracted, and then only those suspended resources which can be pre-empted $U_i = 1$ to $N(S_i)$ in equation 4-A will be re-introduced. It is understood that map $U_i = 1$ to N $(S_i)$ will reflect the resources 130 which the scheduler unit 210 has indicated can be pre-empted by job i as listed in the candidate host list 600. Similarly, all resources which are reserved, represented by R, will be removed and then the resources which can be backfilled for this particular job, represented by $U_i = 1$ to N $(R_i)$ in equation 4-A are re-introduced. It is understood that the operand "+" in equation 4-A refers to a fuel union, meaning the union of those two maps is restricted by the boundaries of the left operand and only bit masks can be charged.

For regular job allocation or slot-reserving job allocation, the equation 4 for the candidate host map $C_i$ may be used directly to calculate the allocation map for a job i and host j as follows:

$$A_i^j = Z(C_i^j, L_i^j, T_i, N_i) = Z(H(F,j) \backslash R \backslash S, L_i^j, T_i, N_i) \qquad \text{EQ 5}$$

A represents the allocation map for host j and job i;
L taken verbatim from the scheduler request;
Z allocation or placement algorithm calculation subset operator For backfilling job, the host map $C_i^j$ is augmented with maps of all jobs 104 that can be used for backfill:

$$C_i^j = \cup_{k=1,K}(C_j \backslash R \backslash S, A_k) \qquad \text{EQ 6}$$

where $C_i^j$ represents the candidate host map for host j and job i.
R represents a map of reserved resources not available for backfill by job i; and
S. represents a map of all of the resources which are suspended;
Ak indicates the resources which are part of the global suspended map S which can be re-introduced or pre-empted for a particular job i.

Equation 6 may be transformed using the allocation replacement algorithm Z to generate the allocation map $A_i^j$ for a particular job i on a particular host j as follows:

$$A_i^j = Z(\cup_{k=1,K}(C_i^j \backslash R \backslash S, A_k), L_i^j, T_i, N_i) \qquad \text{EQ 7}$$

For jobs which have resources that can be pre-empted, such as resources that are presently running or suspended resources, the candidate host map $C_i^j$ for a particular job i and a particular host j can be augmented with maps of all of the resources currently running a job i that can be pre-empted as follows:

$$C_i^j = \cup_{k=1,K}(C_j \backslash R \backslash S, A_k) \qquad \text{EQ 8}$$

where $C_i^j$ represents the candidate host map for host j and job i
R represents a map of reserved resources; and
S represents a map of all of the resources which are suspended;
where Ak represents the map of resources 130 which are presently allocated to other jobs that are running or allocated to jobs which have been suspended and can be pre-empted for job i.

Equation 8 may be transformed using the allocation replacement algorithm Z to generate the allocation map $A_i^j$ for a particular job i on a particular host j as follows:

$$A_i^j = Z(\cup_{k=1,K}(C_j \backslash R \backslash S, A_k), L_i^j, T_i, N_i) \qquad \text{EQ 9}$$

It is understood that once a job 104 has been allocated to certain resources, the free map F of available resources must be modified in order to remove the resources 130 which have now been allocated to the job 104. This information will be reflected in both the status information signals $S_i$ from the topology daemons 120a and/or simply removed from the free map by the following equation:

$$F^n = F^0 \backslash A_i \qquad \text{EQ 10}$$

where F represents free map before allocation of job i; $A_i$ represents the resources 130 allocated to job i; and F represents the free map after allocation of job i.

When scheduler unit 210 decides to honor slot reservation decision for a job i, its allocation map $A_i$ is added to the global reservation map R:

$$R_n = R_o \cup A_i \qquad \text{EQ 11}$$

where Rn represents the global reservation map after the reservation decision for job i has been honored;
$A_i$ is the allocation map for job i; and
Ro is the global reservation map before the decision has been honored.

When scheduler unit 210 decides to run a pre-emptive job, as illustrated, for instance, in FIG. 9, it first suspends all the jobs Ti that have non-empty intersection with the current job map, and then adds those jobs to the suspension maps as illustrated by the following equation:

$$S^n = \cup_{k=1,K}(S^0, A_k) \setminus -/(k) | Ai \cap Ak \neq 0 \qquad \text{EQ 12}$$

Operation of some of the above equations will be illustrated in FIG. 9. For instance, if the scheduling unit 210 according to its scheduling policy can pre-empt both running job T2 and suspended job S4, illustrated by the dashed circle B in FIG. 9, for the job being scheduled, namely job 104, then 10 node boards 10 are available for a backfilling job if they can use reserved resources shown by reservation map R5, as illustrated by the dashed line B2 in FIG. 9. As illustrated in FIG. 9, only one node board 10 is available for a regular job after the suspension map S4 and reservation map R6 are taken into account, as illustrated by the dashed circle B3 in FIG. 9. Accordingly, dashed circles B1, B2, B3 illustrate how non-trivial scheduling of a particular job 104 can be used to pre-empt running jobs T2 and/or backfill reserved map R5 if the scheduling policy for the job 104 permits this. For instance, if the job 104 is not of high priority and does not permit pre-emption of running job T2 and/or cannot be backfilled into reserved map R5, the job 104 having the shape 106 would likely not be able to be scheduled in the current scheduling cycle because only node board 10 indicated by the dashed line B3 would be available for a regular job. In this case, the topology library unit 640 will return the job 104 to the scheduling unit 210 and the scheduling unit 210 will delay allocation of the job 104 for one or more scheduling cycles until the resources 130, which match the resource mapping requirements 106 of the job 104 become available. By contrast, depending on the priority and other policy conditions of the scheduler 210, the shape of the resources 130 may expand to that indicated by the dashed line B2 or the dashed line B1, such that the job 104 could be matched to resources 130 which satisfy its resource mapping requirements in the current scheduler cycle.

It is clear that such an arrangement will facilitate efficient allocation of corresponding jobs 104 according to the scheduling policy and accounting for the shape of the resources 130 as determined by the machine map M and the shape requirements 106 of the job 104. In a preferred embodiment, the candidate host list 600 includes the reserved resources R which have been reserved for larger jobs that have been received in previous scheduling cycles, but have not yet been scheduled and would satisfy the predetermined requirements for backfilling the job 104 currently being scheduled as discussed above. It is understood that the candidate host list 600 would not include resources 130 which do not satisfy the predetermined requirements for backfilling for the job 104 currently being scheduled. When the topology library unit 640 determines the free map F, it will include in the free map F any reserved resources R which can be backfilled, represented by either the dashed line B1, B2, B3 for a particular job 104 and corresponding scheduling policies of the scheduling unit 210, and include these resources 130 in the candidate host list 600 which will then be reflected in the free map F as illustrated by the dashed lines B1, B2, B3 in FIG. 9 and as may be calculated by equations 1 to 9 discussed above according to one preferred embodiment.

Similar to backfilling, the suspended jobs which can be pre-empted for job I (represented by $\cup_{i=1,N}(S_i)$ in the above equations) may be included in the candidate host list 600. The suspended jobs S which can be pre-empted could be included in the free map F as illustrated in FIG. 9 depending on the scheduling policy for a particular job i. The topology library unit 640 will also receive the suspended status information signals $S_i$ indicating which resources 130 have been suspended and will reflect these in the free map F as well as forwarding this information to a scheduling unit 210, for instance, by way of an updated candidate host list 604. Any suspended resources S which satisfy predetermined requirements for executing a job 104, such as requirements based on the scheduling policy of the computer system 1, will be included in the free map F and any suspended resources which do not satisfy predetermined requirements for executing the job 104 will not be included in the free map F as illustrated by the dashed lines B1 and B2. In either case, the shape of the resulting resources 130 will be determined, and, if possible, the job 104 will be mapped to the available resources 130 reflected in the free map F such that the resource mapping requirements 106 of the job 104 would be satisfied.

When a job is finished, its map is returned back to free map:

$$F^n = F^0 \cup A_i \qquad \text{EQ 13}$$

When pre-emptive job is finished, and the pre-empted jobs resumed, their maps are taken out of the suspension map:

$$S^n = S^0 \setminus \cup_{k=1,K}(A_k) \qquad \text{EQ 14}$$

It is also understood that the information regarding a job being finished as represented by equation 13 and equation 14, as well as other information regarding the resources 130 and the jobs 104 executing in the machine 2, such as the information derived from the status information signals $S_i$, will be provided to the scheduling unit 210. In one preferred embodiment, as illustrated in FIG. 6, this information can be provided by way of an updated candidate host list 604 from the second part 120b of the topology component 120 to the scheduling unit 210. It is understood that the updated candidate host list 604 will also reflect the resources 130 being allocated to specific jobs 104 which have been scheduled in the current scheduling cycle and illustrated for instance in equation 10. As discussed above, topology daemons 120a which have allocated the job 104 to the corresponding allocated resources A1 will communicate with the second part 120b of the topology component 120 by way of the status information signals $S_i$ that the job 140 has been allocated and is being executed. This information is also preferably reflected in the updated candidate host list 604. Furthermore, if a job 104 has not been allocated, for whatever reason, the updated candidate host list 604 will reflect this. The job scheduling unit 210 may then optionally delay allocation of the job 104 for one or more scheduling cycles until resources 130 required to execute the job are available. It is understood that this status information signal S1 will generally be provided to the second part 120b of the topology component and reflected in the updated candidate host list 604.

In a preferred embodiment, there is synchronous communication between the first part 120a and the second part 120b of the topology component 120. For instance, it is preferred that the communication to and from the first and second parts 120a and 120b of the topology component 120 be synchronous such that there is no change over time in the resources 130 on the host 40 which will be affected between the time information is sent from the first part 120a of the topology component 120 to the second part 120b of the topology component 120. This will also avoid the second part 120b of the topology component 120 not being able to schedule a job 104 to resources 130 believing the resources having been allocated and executing a previously allocated job 104p when in fact the previously executed job 104p has been completed and the resources 130 have been freed.

As indicated above, the status information signals $S_i$ will include resources 130 which have been configured out and/or are executing jobs which have been scheduled other than through the scheduling unit 210 such as maintenance jobs. However, these events do not occur frequently. As such, a review of all of the resources 130 in the machine 1 may need to be done only 5, 10 or 15 minute intervals depending on the requirements of the machine 1 and the parameter set by the administrators. This is done to avoid the large time-that may be required for the topology daemons 120a to review all of the resources associated with their corresponding hosts 40 and formulate status signals $S_i$. It is understood that nevertheless this should be done periodically in order to determine resources 130 which have been configured out for whatever reason and also possibly locate a job which has not completed or cannot be completed. In between these reviews of the status of the system, the topology component 120 can keep track of the status of the resources by receiving the executed resources and determining which jobs 104 have been completed and therefore have relinquished the allocated resources $A_i$, as reflected for instance in equation 10 above. This information would be provided in the updated candidate host list 604 which is sent from the topology component 120 to the scheduler framework 220. Alternatively, the scheduler framework 220 can monitor the execute job and update its list directly. In either case, it is understood that the updated candidate host list 604 and/or the list maintained by the scheduler framework 220 of allocated suspended, reserved, pre-empted and backfilled jobs, will generally comprise a list without any topological information.

It is understood that other non-trivial scheduling algorithms can also be included in the above invention in addition to reservation, suspension, pre-emption and backfill discussed above. For instance, advanced reservation can be included and can be accounted for by minor modifications to the above formulas. Similarly, the notion of a cumulative map for the scheduling class, and manipulating the free map F according to the scheduling rules of this class may be incorporated.

It is understood that the above equations, while addressed to specific non-trivial scheduling accolades, can also be utilized for any generic type of non-trivial scheduling, which can be defined as scheduling that requires more than one scheduling cycle to schedule a job.

For instance, the topology component 120 may comprise one or more global status maps, represented generally by the symbols Ya, Yb . . . Yn, which are maps indicative of interconnections of resources in the computer system 1 to which the scheduling unit 210 may schedule jobs if non-trivial scheduling is utilized. The general global status maps Yn are more general versions of the reservation map R and the suspension map S discussed above. In this way, equation 4 discussed above may be more generally presented as follows:

$$C_i^j = C_j \backslash R = H(F_j) Ya \backslash Yb \ldots \backslash Yn \qquad \text{EQ 15}$$

Similarly to the reservation map R and the suspension map S, if it is possible for a particular job to be scheduled to resources which are reserved or suspended by utilizing non-trivial scheduling, the resources to which the particular job 104 can be scheduled utilizing non-trivial resources can be re-introduced into the free map F for the particular host and job $C_i^j$ as follows:

$$C_i^j = H(F_j) \backslash Ya \backslash Yb \ldots \backslash Yn + U_i = N(Y_{ai}) + U_i = 1, N(Ybi) \qquad \text{EQ 16}$$

It will be appreciated that, in the particular situation where the global status map Yn is a suspension map S, the resources which can be re-introduced to the free map for a particular host $C_i^j$ and a particular job i will represent the resources which are currently suspended, but which the scheduling unit 120 has determined the job being scheduled has sufficient priority pursuant to the current predetermined scheduling requirement, can be pre-empted for the job i being scheduled. Similarly, it will be appreciated that, in the particular situation where the global status map Yn is a reservation map R, the resources which can be re-introduced to the free map for a particular host $C_i^j$ and a particular job i will represent the resources which are currently reserved, but which the scheduling unit 210 has determined the job being scheduled has sufficient priority pursuant to the current predetermined scheduling requirement, can be backfilled for the job i being scheduled.

It is understood that the resources to which the job i can be scheduled utilizing non-trivial scheduling will be indicated in the candidate host list 600, but may be indicated separately. This would be preferred in order to permit the topology component 120 to match the job i initially to resources without using non-trivial scheduling in order to further improve efficiency and avoid either backfilling or pre-empting existing resources which have been reserved or suspended. Therefore, it is preferred that the topology component initially attempt to map the shape requirements of the job to the resources in the free map without utilizing non-trivial scheduling.

As an example. advanced reservation scheduling policy will be realized with a per-job advanced reservation map, $Q_i$, that will represent the resources which have been reserved for the job and the total advanced reservation map Q. The hostmap for the particular host and job $C_i^j$ will be formed as follows:

$$C_i^j = H(F_j) \backslash Q + Q_i \qquad \text{EQ 17}$$

When the resources $Q_i$ for a particular job are reserved, the advanced reservation map will be altered to include these resources as follows:

$$Q_n = Q_0 \cup Q_i \qquad \text{EQ 18}$$

When the job is actually started, the reservation map will be altered to remove these resources as illustrated by the following equation:

$$Q_n = Q_0 \backslash Q_i \qquad \text{EQ 19}$$

It is understood that the suspension map S and the resource map R, as well as the other general global status maps Yn, will be maintained and periodically updated by the topology component 120. For example, as resources are added or removed to the general global status maps Yn the map will correspondingly change. The same will be true for specific global maps, such as the suspension map S and reserved map R.

While the above equations reflect a generic application of the allocation algorithm, the following is a more specific equation for determining a free map F according to a preferred embodiment utilizing a specific type of scheduler, such as the LSF (trade mark) scheduler manufactured by Platform Computing Inc.:

$$F_i^j = H^j(F) \backslash (S \backslash \cup_{i=1,N}(S_i) \backslash S_o|_{policy=MIGRATE}) \backslash \backslash$$
$$(R \backslash Ro|_{mode=BACKFILL \backslash PREEMPT} \cup_{i=1,N}(Ro_i)$$
$$|_{mode=BACKFILL \backslash PREEMPT}) + + \cup_{i=1,N}(T_i)$$
$$|_{mode=PREEMPT} \backslash (E \backslash Eo) \qquad \text{EQ 20}$$

where $H^j(F)$ host to set translation operator, architecture and implementation specific, for host j F machine free map non-volatile suspension map $\cup_{i=1,N}(S_i)$ union of all suspended jobs that are allowed to be taken over for this job R volatile reservation map, a union of all reservation decisions of the last scheduling cycle Ro job's own last reservation map $\cup_{i=1,N}(Ro_i)$ union of all slot reserving jobs that are allowed to be preempted or backfilled by this job $\cup_{i=1,N}(T_i)$ union of all running jobs that are allowed to be preempted by this job E non-volatile preemption reservation map, a union of all preemption reservation decisions Eo job's own last preemption reservation map So job's own map preserved over migration re-calculation cycle As illustrated by the above equation, the free map F will reflect both backfilling, pre-emption and other non-trivial scheduling techniques discussed above and reflected in the above equation.

Management of reservation map is specific to the scheduler implementation, e.g. it could be discarded on the beginning of each scheduling session, or kept between scheduling session. It will be understood by those skilled in the art that many modifications and variations may be made in the present claim without departing from the spirit and the scope thereof.

It is understood that the term "jobs" as used herein generally refers to computer tasks that require various resources of a computer system to be processed. The resources a job may require include computational resources of the host system, memory retrieval/storage resources, output resources and the availability of specific processing capabilities, such as software licenses or network bandwidth.

It is also understood that the term "memory" as used herein is generally intended in a general, non-limiting sense. In particular, the term "memory" can indicate a distributed memory, a memory hierarchy, such as comprising banks of memories with different access times, or a set of memories of different types.

It is also understood that, while the present invention has been described in terms of particular types of multiprocessor systems having topological requirements, the present invention is not restricted to the specific systems or machines disclosed herein. Rather, the present invention can be modified to support other types of machine architecture, with the status information signals Is containing corresponding information.

It is understood that the terms "resources 130", "node board 10", "groups of node boards 10" and "CPUset(s)" and processor sets have been used to define both requirements to execute a job 104 and the ability to execute the job 104. In general, resources 130 have been used to refer to any part of computer system, such as CPUs 12, 14, node boards 10, memory 18, computer licensing, as well as data or code that can be allocated to a job 104. The term "groups of node boards 10" has been generally used to refer to various possible arrangements or topologies of node boards 10, whether or not on the same host 40, and include processor sets, which is generally intended to refer to sets of CPUs 12, 14, generally on node boards 10, which have been created and allocated to a particular job 104.

It is further understood that the terms modules and hosts have been used interchangeably to refer to the physical configuration where the processors or groups of nodes are physically located. It is understood that the different actual physical configurations, and, different terms to describe the physical configurations, may be used as is known to a person skilled in the art. However, it is understood that the terms hosts and modules refer to clusters and processors, having non-uniform memory access architecture.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments that are functional, electrical or mechanical equivalents of the specific embodiments and features that have been described and illustrated herein.

What is claimed is:

1. A computer system, comprising:
   a processor for executing computing instructions;
   a memory for storing the computing instructions; and
   a topology monitoring unit associated with the processor and the memory to generate a topology map of a machine, the machine having node boards in host computers, the topology map indicative of interconnections of resources of the machine, the topology monitoring unit operable to:
   query the machine and identify the resources of the machine;
   store all the resources of the machine in a string array;
   generate a key for each resource as an array of integers, each integer in the array representing an offset into the string array;
   generate the topology map of the machine using the generated keys;
   assess a status of the resources and generate status signals indicative of the status of the resources; and
   dispatch a job to the resources based on a mapping of resources via the keys.

2. The computer system of claim 1, wherein each integer in the key represents a different level in the machine.

3. The computer system of claim 1, wherein each key is unique for a respective resource.

4. The computer system of claim 2, wherein a lowest level in the key corresponds to a respective node board.

5. The computer system of claim 1, wherein the key includes a bit-mask to represent a central processing unit of a respective node board.

6. A method, comprising:
   querying a machine to identify resources of the machine, the machine having node boards in host computers;
   storing all the resources of the machine in a string array;
   generating a key for each resource as an array of integers, each integer in the array representing an offset into the string array;
   generating a topology map of the machine using the generated keys, the topology map indicative of interconnections of the resources of the machine;
   assessing a status of the resources and generating status signals indicative of the status of the resources; and dispatching a job to the resources based on a mapping of resources via the keys.

7. The method of claim 6, further comprising setting each integer in the key to represent a different level in the machine.

8. The method of claim 6, further comprising generating each key being unique for a respective resource.

9. The method of claim 7, further comprising setting a lowest level in the key as corresponding to a respective node board.

10. The method of claim 6, further comprising including a bit-mask in the key to represent a central processing unit of a respective node board.

11. A computer program product for generating a topology map of a machine, the computer program product comprising:
   a non-transitory computer readable medium having computer readable program code embodied therewith, the computer readable program code comprising computer readable program code configured to:
      query the machine to identify resources of the machine, the machine having node boards in host computers;
      store all the resources of the machine in a string array;
      generate a key for each resource as an array of integers, each integer in the array representing an offset into the string array;
      generate the topology map of the machine using the generated keys, the topology map indicative of interconnections of the resources of the machine;
      assess a status of the resources and generate status signals indicative of the status of the resources; and
      dispatch a job to the resources based on a mapping of resources via the keys.

12. The computer program product of claim 11, wherein the computer readable program code is configured to set each integer in the key to represent a different level in the machine.

13. The computer program product of claim 11, wherein the computer readable program code is configured to generate each key being unique for a respective resource.

14. The computer program product of claim 12, wherein the computer readable program code is configured to set a lowest level in the key as corresponding to a respective node board.

15. The computer program product of claim 11, wherein the computer readable program code is configured to include a bit-mask in the key to represent a central processing unit of a respective node board.

* * * * *